US008576146B2

(12) United States Patent
Park et al.

(10) Patent No.: US 8,576,146 B2
(45) Date of Patent: Nov. 5, 2013

(54) DISPLAY DEVICE AND DRIVING METHOD THEREOF

(75) Inventors: Soon-Ryong Park, Yongin (KR); Shingo Kawashima, Yongin (KR); Hee-Seong Jeong, Yongin (KR); Woo-Suk Jung, Yongin (KR); Gun-Shik Kim, Yongin (KR); Jae-Shin Kim, Yongin (KR); Joo-Hwa Lee, Yongin (KR); Jun-Sik Oh, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 594 days.

(21) Appl. No.: 12/874,181

(22) Filed: Sep. 1, 2010

(65) Prior Publication Data

US 2011/0109782 A1 May 12, 2011

(30) Foreign Application Priority Data

Nov. 12, 2009 (KR) ........................ 10-2009-0109279

(51) Int. Cl.

| | |
|---|---|
| ***H04N 5/222*** | (2006.01) |
| ***G09G 3/28*** | (2013.01) |
| ***G09G 3/30*** | (2006.01) |

(52) U.S. Cl.
USPC ................................................ 345/76; 345/63

(58) Field of Classification Search
USPC ...................................................... 345/76–86
See application file for complete search history.

(56) References Cited

U.S. PATENT DOCUMENTS

2006/0279480 A1 * 12/2006 Johnson et al. ................. 345/63
2009/0225010 A1 * 9/2009 Kimura ........................... 345/76

FOREIGN PATENT DOCUMENTS

| | | |
|---|---|---|
| JP | 2008-203647 | 9/2008 |
| KR | 10-2005-0070550 | 7/2005 |
| KR | 10-2006-0135134 | 12/2006 |
| KR | 10-2007-0106413 | 11/2007 |
| KR | 10-2008-0076203 | 8/2008 |
| KR | 10-2008-0079009 | 8/2008 |
| KR | 10-2009-0015302 | 2/2009 |

* cited by examiner

*Primary Examiner* — Alexander Eisen
*Assistant Examiner* — Amit Chatly
(74) *Attorney, Agent, or Firm* — Christie, Parker & Hale, LLP

(57) ABSTRACT

A display device and a driving method thereof for easily determining photographing timing and recognizing text by improving field visibility. The display device includes: a signal controller generating image data and an image control signal in accordance with an input signal; and a display unit including scan lines transmitting scan signals, data lines transmitting data signals, and pixels connected to the scan lines and data lines and displaying an image corresponding to the image data. Here, when the input signal is an image signal for displaying a photographed image or text, the signal controller generates the image data to correspond to a unit frame period composed of frames as weighted image data corresponding to one of the frames, and the display device displays an image corresponding to the weighted image data to have an energy proportional to a number of the frames in the unit frame period.

16 Claims, 3 Drawing Sheets

DISPLAY DEVICE AND DRIVING METHOD THEREOF

CROSS-REFERENCE TO RELATED APPLICATION

This application claims priority to and the benefit of Korean Patent Application No. 10-2009-0109279, filed in the Korean Intellectual Property Office on Nov. 12, 2009, the entire content of which is incorporated herein by reference.

BACKGROUND

1. Field

The following description relates to a display device and a driving method thereof, and more particularly, to a display device including an organic light emitting diode and a driving method thereof.

2. Description of Related Art

A display device has a display area (or display region) in which a plurality of pixels are disposed on a substrate in a matrix form, and performs a display operation by selectively applying a data signal to a pixel connected to a scan line and a data line. The display device can be classified as either a passive matrix light emitting display device or an active matrix light emitting display device according to a driving scheme of the pixels. The active matrix light emitting display device is a type of device in which unit pixels are selectively lighted and has relatively good resolution, contrast, and operation speed.

Here, the display devices may be used as portable information terminals for personal computers, mobile phones, PDAs, and the like, as well as monitors for various suitable information equipment. A liquid crystal display (LCD) device using a liquid crystal panel, an organic light emitting diode display device using an organic light emitting diode, a plasma display panel (PDP) display device using a plasma panel, etc., are known. In recent years, various suitable light emitting display devices having less weight and volume than a comparable cathode ray tube have been developed, and in particular, an organic light emitting diode display device having relatively high emission efficiency, luminance, and viewing angle as well as rapid response speed has attracted attention.

Also, as a mobile phone is generally now recognized as a requisite, it has incorporated various suitable functions. One of these suitable functions is a camera function. However, since the display device of the mobile phone is generally not designed to be viewed in the field under strong sunshine when a photograph is being taken by utilizing a camera incorporated in the mobile phone, it may be difficult to determine the proper photograph timing. Further, it may be difficult to read text when reading and/or verifying it through the mobile phone.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of embodiments of the present invention are directed toward a display device that is capable of improving field visibility, and an operation method thereof.

An exemplary embodiment of the present invention provides a display device that includes a signal controller for generating image data and an image control signal in accordance with an input signal; and a display unit including a plurality of scan lines for transmitting a plurality of scan signals, a plurality of data lines for transmitting a plurality of data signals, and a plurality of pixels connected to the plurality of scan lines and the plurality of data lines and configured to display an image corresponding to the image data. Here, when the input signal is an image signal for displaying a photographed image or text, the signal controller is configured to generate the image data to correspond to a unit frame period composed of a plurality of frames as weighted image data corresponding to one frame period of the plurality of frames, and the display device is configured to display an image corresponding to the weighted image data to have an energy proportional to a number of the plurality of frames in the unit frame period.

In one embodiment, the signal controller is configured to receive a camera driving signal from a camera for generating the photographed image and to generate the image control signal to display the photographed image as the weighted image data in accordance with the cameral driving signal. Here, the image control signal may include a scan start signal for controlling a timing of when the plurality of scan signals start to be applied to the plurality of scan lines, and the signal controller may be configured to decrease a frequency of the scan start signal during a period when the camera driving signal is applied at a ratio that is inversely proportional to the number of the plurality of frames in the unit frame period in comparison with a frequency during a general operation period when the camera driving signal is not applied. The image control signal may include a load signal for controlling a timing of when the plurality of data signals start to be applied to the plurality of data lines, and the signal controller may be configured to generate the load signal in synchronization with the scan start signal.

In one embodiment, the signal controller is configured to control a level of the data signal in accordance with the number of the plurality of frames in the unit frame period during a period when the camera driving signal is applied.

In one embodiment, each of the plurality of pixels includes an organic light emitting diode for emitting light by a current corresponding to a difference between the data signal and a set power voltage, and the signal controller is configured to change a level of the data signal so that a magnitude of a current that flows to the organic light emitting diode during a period when the camera driving signal is applied increases to be in proportion to the number of the plurality of frames in the unit frame period in comparison with a magnitude of a current that flows to the organic light emitting diode during a general operation period when the camera driving signal is not applied.

In one embodiment, the signal controller is configured to generate the image control signal to display the text as the weighted image data in accordance with a text display signal. Here, the image control signal may include a scan start signal for controlling a timing of when the plurality of scan signals start to be applied to the plurality of scan lines, and the signal controller may be configured to decrease the frequency of the scan start signal during a period when the text display signal is applied at a ratio that is inversely proportional to the number of the plurality of frames in the unit frame period in comparison with a frequency during a general operation period when the text display signal is not applied. The image control signal may include a load signal for controlling a timing of when the plurality of data signals start to be applied to the plurality of data lines, and the signal controller may be configured to generate the load signal in synchronization with the scan start signal.

In one embodiment, the signal controller is configured to control a level of the data signal in accordance with the number of the plurality of frames in the unit frame period during a period when the text display signal is applied.

In one embodiment, each of the plurality of pixels includes an organic light emitting diode for emitting light by a current corresponding to a difference between the data signal and a set power voltage, and the signal controller is configured to change a level of the data signal so that a magnitude of a current that flows to the organic light emitting diode during a period when the text display signal is applied increases to be in proportion to the number of the plurality of frames in the unit frame period in comparison with a magnitude of a current that flows to the organic light emitting diode during a general operation period when the text display signal is not applied.

In addition, another embodiment of the present invention provides a driving method of a display device including a plurality of scan lines for transmitting a plurality of scan signals, a plurality of data lines for transmitting a plurality of data signals, and a plurality of pixels connected to the plurality of scan lines and the plurality of data lines and configured to display an image corresponding to image data. The method includes generating the image data and an image control signal in accordance with an input signal, the generating of the image data and the image control signal including: when the input signal is an image signal for displaying a photographed image or text, generating the image data corresponding to a unit frame period composed of a plurality of frames as weighted image data corresponding to one frame period of the plurality of frames; and increasing an energy of an image of the display device corresponding to the weighted image data in proportion to a number of the plurality of frames in the unit frame period.

In one embodiment, the generating of the weighted image data includes receiving a camera driving signal from a camera for generating the photographed image, and determining whether or not the input signal is the image signal for displaying the photographed image in accordance with the camera driving signal. Here, the generating of the weighted image data may include: generating a scan start signal for controlling a timing of when the plurality of scan signals start to be applied to the plurality of scan lines in synchronization with the camera driving signal; and decreasing a frequency of the scan start signal during a period when the camera driving signal is applied at a ratio that is inversely proportional to the number of the plurality of frames in the unit frame period in comparison with a frequency during a general operation period when the camera driving signal is not applied. The increasing of the energy of the weighted image data in proportion to the number of plurality of frames in the unit frame period may include: generating a load signal for controlling a timing of when the plurality of data signals start to be applied to the plurality of data lines in synchronization with the scan start signal; and controlling a level of the plurality of data signals so that a brightness of the plurality of pixels during a period when the camera driving signal is applied increases to be in proportion to the number of the plurality of frames in the unit frame period in comparison with a brightness of the plurality of pixels during the general operation period.

In one embodiment, the generating of the weighted image data includes determining whether or not the input signal is the image signal for displaying the text in accordance with a text display signal. Here, the generating of the weighted image data may include: generating a scan start signal for controlling a timing of when the plurality of scan signals start to be applied to the plurality of scan lines in synchronization with the text display signal; and decreasing a frequency of the scan start signal during a period when the text display signal is applied at a ratio that is inversely proportional to the number of the plurality of frames in the unit frame period in comparison with a frequency during a general operation period when the text display signal is not applied. The increasing of the energy of the weighted image data in proportion to the number of plurality of frames in the unit frame period may include: generating a load signal for controlling a timing of when the plurality of data signals start to be applied to the plurality of data lines in synchronization with the scan start signal; and controlling a level of the plurality of data signals so that a brightness of the plurality of pixels during a period when the text display signal is applied increases to be in proportion to the number of the plurality of frames in the unit frame period in comparison with a brightness of the plurality of pixels during the general operation period.

As described above, according to an embodiment of the present invention, it is possible to easily determine photographing timing and recognize text by improving field visibility.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
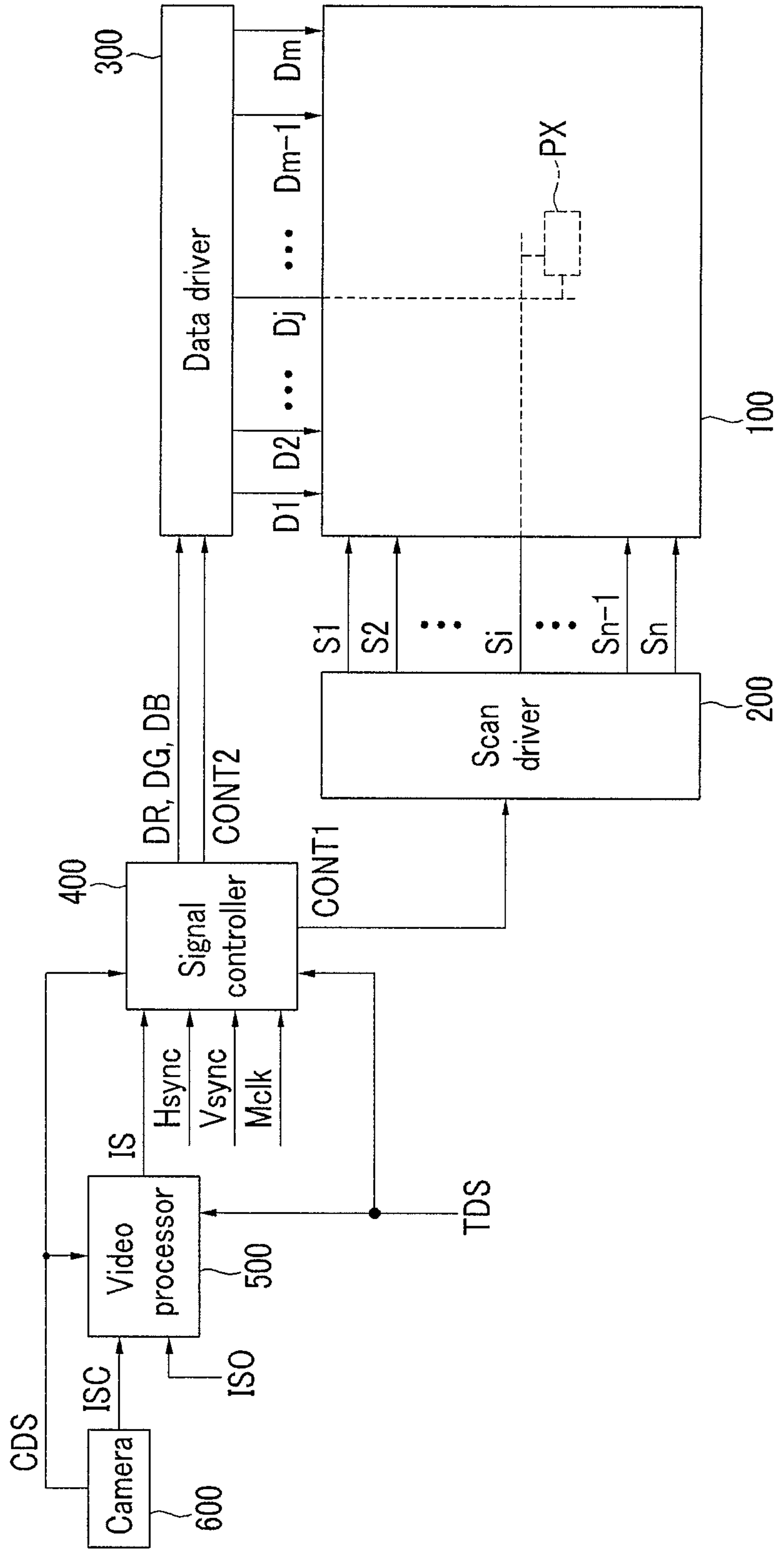
FIG. 1 is a block diagram illustrating a display device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification and the claims that follow, when it is described that a first element is "coupled or connected" to a second element, the first element may be "directly coupled or connected" to the second element or "electrically coupled or connected" to the second element through one or more third elements. In addition, unless explicitly described to the contrary, the word "comprise" and variations such as "comprises" or "comprising" will be understood to imply the inclusion of stated elements but not the exclusion of any other elements.

Figure 2:
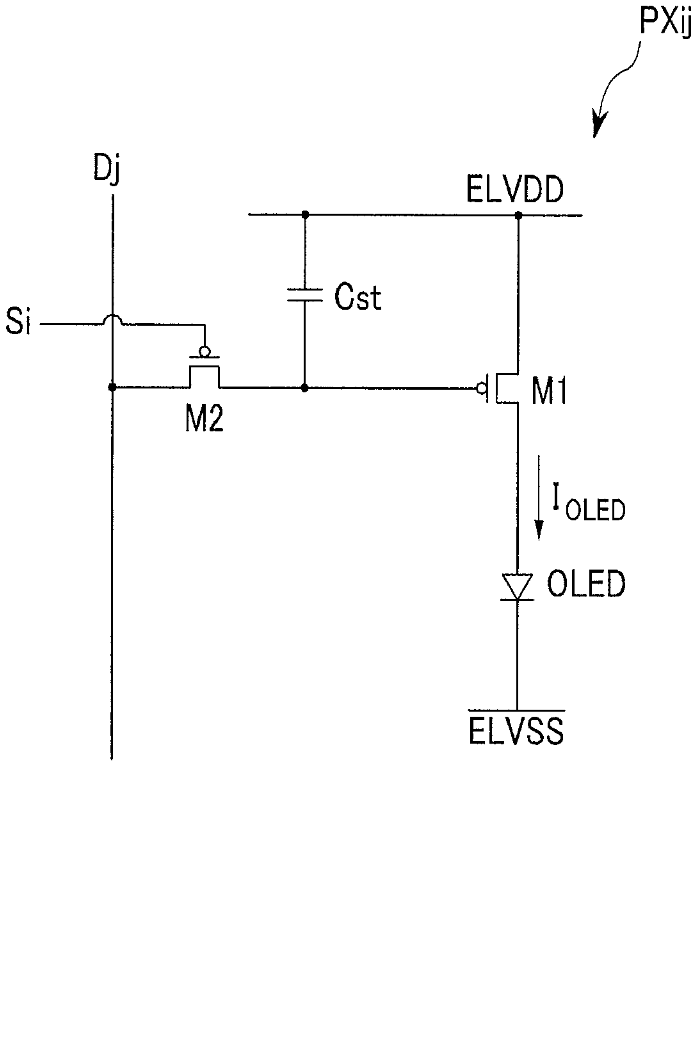
FIG. 2 is an equivalent circuit diagram of a pixel PX shown in FIG. 1.

FIG. 1 is a block diagram of a display device according to an exemplary embodiment of the present invention, and FIG. 2 is an equivalent circuit diagram of a pixel PX shown in FIG. 1.

Referring to FIG. 1, the display device includes a display unit (or display region) 100, a scan driver 200, a data driver 300, a signal controller 400, a video processor 500, and a camera 600. The display unit 100 includes a plurality of signal lines S1 to Sn and D1 to Dm, and a plurality of pixels PX that are connected to the signal lines and arranged in a matrix form in an equivalent circuit perspective. The signal lines S1 to Sn and D1 to Dm include a plurality of scan lines S1 to Sn for transferring scan signals and a plurality of data lines D1 to Dm for transferring data signals. The scan lines S1 to Sn extend substantially in a row direction and are substantially parallel to each other, and the data lines D1 to Dm extend substantially in a column direction and are substantially parallel to each other.

Referring to FIG. 2, each of the pixels PX, for example the pixel PXij that is connected to an i-th scan line $S_i$ (i=1, 2, . . . , n) and a j-th data line Dj (j=1, 2, . . . , m) includes an organic light emitting diode OLED, a driving transistor M1, a capacitor Cst, and a switching transistor M2. The driving transistor M1 receives a first driving voltage ELVDD at a source terminal thereof, and is connected to an anode terminal of the organic light emitting diode OLED at a drain terminal thereof. A gate terminal of the driving transistor M1 is connected to a drain terminal of the switching transistor M2. The driving transistor M1 allows a current $I_{OLED}$ of which magnitude varies depending on a voltage applied between the gate terminal and the drain terminal to flow to the organic light emitting diode OLED. A gate terminal of the switching transistor M2 is connected to the scan line Si and a source terminal thereof is connected to the data line Dj. The switching transistor M2 performs a switching operation in response to a scan signal applied to the scan line Si, and when the switching transistor M2 is turned on, a data signal applied to the data line Dj, that is, a data voltage, is transmitted to the gate terminal of the driving transistor M1.

The capacitor Cst is connected between the source terminal and the gate terminal of the driving transistor M1. The capacitor Cst charges the data voltage applied to the gate terminal of the driving transistor M1 and maintains it even after the switching transistor M2 is turned off.

The organic light emitting diode OLED receives a second driving voltage ELVSS at a cathode terminal thereof. The organic light emitting diode OLED emits light of an intensity that varies depending on the current $I_{OLED}$ that the driving transistor M1 supplies. The organic light emitting diode OLED can emit light having one of the primary colors. Examples of the primary colors include red, green, and blue, and a desired color is displayed by a spatial or temporal sum of these primary colors (or sum of the three primary colors). In one embodiment, some of the organic light emitting diodes OLED may emit white light, and thus luminance increases. Also, in one embodiment, the organic light emitting diode OLED of each of the pixels PX may emit white light, and some pixels PX may further include a color filter that converts the white light emitted from the organic light emitting diode OLED into any one light of the primary colors.

Also, in FIG. 2, although the driving transistor M1 and the switching transistor M2 are shown as p-channel field effect transistors (FETs), the present invention is not limited thereto, and at least one of the driving transistor M1 and the switching transistor M2 may be an n-channel field effect transistor. Further, the connection relationship of the driving transistor M1, the switching transistor M2, the capacitor Cst, and the organic light emitting diode OLED may be changed. The pixel PX shown in FIG. 2 is one example of one pixel of the display device, and a pixel having a different type including at least two transistors or at least one capacitor may be suitably adopted. For example, in one embodiment, the pixel PXij also includes a light emitting control transistor M3 between the driving transistor M1 and the organic light emitting diode OLED to further control the emission of light from the organic light emitting diode OLED.

Referring back to FIG. 1, the scan driver 200 is connected to the scan lines S1 to Sn of the display unit 100, and sequentially applies the scan signals to the scan lines S1 to Sn in accordance with a scan control signal CONT1. The scan signal is composed of (or constituted by) a gate-on voltage Von that can turn on the switching transistor M2 and a gate-off voltage Voff that can turn off the switching transistor M2. In a case when the switching transistor M2 is the p-channel field effect transistor, the gate-on voltage Von and the gate-off voltage Voff are a low voltage and a high voltage, respectively (i.e., the gate-on voltage Von is higher in voltage level than the gate-off voltage Voff).

The data driver 300 is connected to the data lines D1 to Dm of the display unit 100, and converts image data DR, DG, and DB into data voltages and applies them to the data lines D1 to Dm in accordance with a data control signal CONT2.

The camera 600 is actuated by a user. When the user presses an external key for actuating the camera 600, a camera driving signal CDS is generated and transmitted to the video processor 500 and the signal controller 400. In the embodiment of the present invention, the camera driving signal CDS is defined as a pulse signal that is maintained at a high level during a camera driving period. In addition, an image signal ISC displaying an image photographed by the camera 600 is transmitted to the video processor 500.

The video processor 500 performs image processing of the image signal ISC transmitted from the camera 600, and converts the signal into an input signal IS during a period when the camera driving signal CDS is at the high level (hereinafter referred to as "camera driving mode").

In addition, when the video processor 500 senses a request for checking received text from a user, the video processor 500 performs image processing of an image signal (hereinafter referred to as "text image signal") representing the text included in the image signal ISO to convert the text into the input signal IS. More specifically, a high-level text display signal TDS is generated in accordance with the text checking request, and the text display signal TDS is at the high level during a period when the user checks the text. A driving mode of the display device during this period is referred to as a text display mode.

In the embodiment of the present invention, periods when the camera driving signal CDS and the text display signal TDS are at the high level are defined as the camera driving mode and the text display mode, respectively, and periods when the camera driving signal CDS and the text display signal TDS are at a low level are defined as a typical (or normal) operation mode.

In the typical operation mode, the video processor 500 performs the image processing of the image signal ISO to generate the input signal IS, and a suitable operation thereof is performed.

The signal controller 400 receives the input signal IS, a horizontal synchronization signal Hsync, a vertical synchronization signal Vsync, and a main clock signal Mclk to generate the image data DR, DG, and DB, the scan control signal CONT1, and the data control signal CONT2. The signal controller 400 increases the energy of the image data DR, DG, and DB in accordance with the camera driving signal CDS and/or the text display signal TDS to generate the image data as weighted image data. A detailed description thereof will be described below in more detail.

The scan control signal CONT1 includes a scan start signal SW directing scan starting, at least one clock signal for controlling an output cycle of the gate-on voltage Von, and an output enable signal OE defining a continuous time of the gate-on voltage Von. The scan start signal SW is generated by being synchronized with the vertical synchronization signal Vsync for each frame in the typical operation mode. In addition, the frequency of the scan start signal SW is divided to display the image by a unit of at least two frames in the camera driving mode or the text display mode. For example, in a case where the scan start signal SW controls the scan driver 200 by a unit of four frames, the scan start signal SW actuates the scan driver 200 in an n-th frame and actuates the scan driver 200 in an n+4-th frame. Here, actuating the scan driver 200 refers to a case that the plurality of scan signals are sequentially transmitted to the plurality of scan lines S1 to Sn. Here, the image is then displayed on the display unit 100 only in the n-th frame and the n+4-th frame. Consequently, in the typical operation mode, in a case where the frequency of one frame is 60 Hz, when the image is displayed by the unit of four frames in the camera driving mode or the text display mode, the frequency of the scan start signal SW is decreased to a quarter, that is, to 15 Hz. Hereinafter, the interval among the frames in which the image is displayed in the camera driving mode or the text display mode is referred to as a "unit frame period". In general, when the image is photographed by the camera, a still image is generated. Therefore, images of continuous frames are very similar to each other. As a result, even though any change of the image is displayed in only one of the two frames by dividing the frequency by the number (or unit) of the at least two frames, the image of the other frame is similar to the one frame in which the image is displayed. Therefore, an image actually recognized by a user has no difference from the image photographed by the camera.

In addition, the data control signal CONT2 includes a horizontal synchronization start signal STH indicating a transmission start of the image data DR, DG, and DB for the pixel PX of one row to the data driver 300 and a load signal LOAD indicating application of the data voltage to the data lines D1 to Dm. The load signal LOAD according to the embodiment of the present invention is synchronized with the scan start signal STV. Further, the data control signal CONT2 includes a brightness control signal BRC generated in synchronization with the camera driving signal CDS or the text display signal TDS. When the brightness control signal BRC is inputted, the data driver 300 controls the magnitude of the data voltage depending on the number of frames in the unit frame period. Like the example, when the number of frames is 4 in the unit frame period, the data driver 300 controls the data voltage so as to display an image corresponding to the weighted image data having energy magnitude that is four times that of the frame image displayed in the general operation mode. More specifically, the data driver 300 reduces the data voltage in order to amplify the image energy of the frame displayed quadruply when the driving transistor M1 is the p-channel type. Then, the gate-source voltage of the driving transistor M1 increases to increase the driving current $I_{OLED}$. When the brightness of the organic light emitting diode OLED is set as a factor representing the image energy of the frame, the data voltage is decreased so as to increase the driving current $I_{OLED}$ quadruply.

Figure 3A:
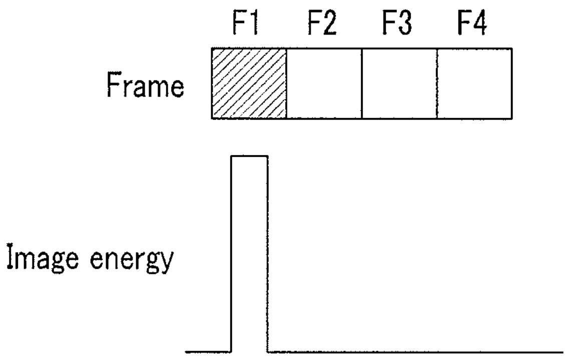
FIGS. 3A and 3B are diagrams for describing a driving method of a display device according to an exemplary embodiment of the present invention.
Figure 3B:
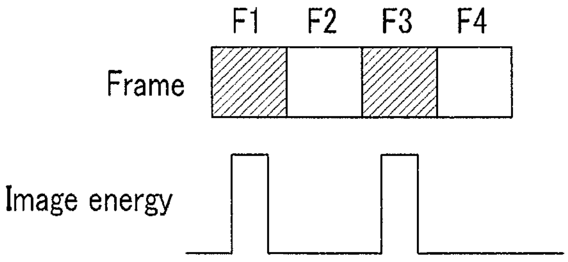

FIGS. 3A and 3B are diagrams for describing a driving method of a display device according to an embodiment of the present invention. FIG. 3A shows four frames, and a shaded frame is a frame where an image is displayed. In FIG. 3A, the image is displayed by the unit of four frames, and in FIG. 3B, the image is displayed by the unit of two frames.

Referring to FIGS. 3A and 3B, when a user presses an external key for driving a camera, a camera driving signal CDS changes to a high level from a low level. Then, the signal controller 400 transmits to a scan driver 200 a scan start signal SW for reducing the frequency to a ratio that is inversely proportional to the number of frames during a unit frame period at the time when the camera driving signal CDS has the high level. Here, in FIG. 3A, the scan start signal SW allows the scan driver 200 to operate in only a first frame F1 of the four frames, and in FIG. 3B, the scan start signal SW allows the scan driver 200 to operate in the first frame F1 and a third frame F3. Further, the signal controller 400 transmits a load signal LOAD that is synchronized with the scan start signal SW to a data driver 300. Accordingly, the data driver 300 operates in synchronization with the operation timing of the scan driver 200. Here, the data driver 300 applies to a plurality of data lines D1 to Dm data voltages of which magnitude are controlled so that the energy level of a frame image is increased to a ratio that is in proportion to the number of frames during the unit frame period depending on the brightness control signal BRC. As a result, in FIG. 3A, the energy level of the image displayed on a display unit 100 is four times larger than that in a general operation mode in the first frame F1, and in FIG. 3B, the energy level of the image displayed on the display unit 100 is twice that in the general operation mode in the first and third frames F1 and F3.

As such, according to the embodiment of the present invention, during a camera driving mode, a photographed image is expressed in high brightness at a regular time interval, such that a user can more clearly recognize an image photographed by a camera. Accordingly, field visibility is improved and it is easy to determine photograph timing.

Thus far, the camera driving mode has been described. The driving method of the display device in a text display mode is the same (or substantially the same) as in the camera driving mode. More specifically, the signal controller 400 reduces the frequency of the scan start signal STV to a ratio that is inversely proportional to the number of frames during the unit frame period in accordance with a text display signal TDS instead of the camera driving signal CDS. Further, the signal controller 400 controls the level of a data signal (or voltage) so that the energy level of the frame image is increased to a ratio that is proportional to the number of frames during the unit frame period. Accordingly, text is expressed with high brightness at a regular time interval to improve the field visibility.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:

a signal controller for generating image data and an image control signal in accordance with an input signal; and a display unit comprising a plurality of scan lines for transmitting a plurality of scan signals, a plurality of data lines for transmitting a plurality of data signals, and a plurality of pixels connected to the plurality of scan lines and the plurality of data lines and configured to display an image corresponding to the image data, wherein when the input signal is an image signal for displaying a photographed image or text, the signal controller is configured to generate the image data to correspond to a unit frame period composed of a plurality of frames as weighted image data corresponding to one frame period of the plurality of frames, wherein the display device is configured to display an image corresponding to the weighted image data to have an energy proportional to a number of the plurality of frames in the unit frame period, wherein an image control signal comprises a scan start signal for controlling a timing of when the plurality of scan signals start to be applied to the plurality of scan lines, and wherein the signal controller is configured to decrease a frequency of the scan start signal during a period when a camera driving signal is applied at a ratio that is inversely proportional to the number of the plurality of frames in the unit frame period in comparison with a frequency during a general operation period when the camera driving signal is not applied.

2. The display device of claim 1, wherein the signal controller is configured to receive the camera driving signal from a camera for generating the photographed image and to generate the image control signal to display the photographed image as the weighted image data in accordance with the camera driving signal.

3. The display device of claim 1, wherein the image control signal comprises a load signal for controlling a timing of when the plurality of data signals start to be applied to the plurality of data lines, and the signal controller is configured to generate the load signal in synchronization with the scan start signal.

4. The display device of claim 2, wherein the signal controller is configured to control a level of the data signal in accordance with the number of the plurality of frames in the unit frame period during a period when the camera driving signal is applied.

5. The display device of claim 2, wherein each of the plurality of pixels comprises an organic light emitting diode for emitting light by a current corresponding to a difference between the data signal and a set power voltage, and the signal controller is configured to change a level of the data signal so that a magnitude of a current that flows to the organic light emitting diode during a period when the camera driving signal is applied increases to be in proportion to the number of the plurality of frames in the unit frame period in comparison with a magnitude of a current that flows to the organic light emitting diode during a general operation period when the camera driving signal is not applied.

6. The display device of claim 1, wherein the signal controller is configured to generate the image control signal to display the text as the weighted image data in accordance with a text display signal.

7. The display device of claim 6, wherein the image control signal comprises a scan start signal for controlling a timing of when the plurality of scan signals start to be applied to the plurality of scan lines, and the signal controller is configured to decrease a frequency of the scan start signal during a period when the text display signal is applied at a ratio that is inversely proportional to the number of the plurality of frames in the unit frame period in comparison with a frequency during a general operation period when the text display signal is not applied.

8. The display device of claim 7, wherein the image control signal comprises a load signal for controlling a timing of when the plurality of data signals start to be applied to the plurality of data lines, and the signal controller is configured to generate the load signal in synchronization with the scan start signal.

9. The display device of claim 7, wherein the signal controller is configured to control a level of the data signal in accordance with the number of the plurality of frames in the unit frame period during a period when the text display signal is applied.

10. The display device of claim 7, wherein each of the plurality of pixels comprises an organic light emitting diode for emitting light by a current corresponding to a difference between the data signal and a set power voltage, and the signal controller is configured to change a level of the data signal so that a magnitude of a current that flows to the organic light emitting diode during a period when the text display signal is applied increases to be in proportion to the number of the plurality of frames in the unit frame period in comparison with a magnitude of a current that flows to the organic light emitting diode during a general operation period when the text display signal is not applied.

11. A driving method of a display device including a plurality of scan lines for transmitting a plurality of scan signals, a plurality of data lines for transmitting a plurality of data signals, and a plurality of pixels connected to the plurality of scan lines and the plurality of data lines and configured to display an image corresponding to image data, wherein the method comprises generating the image data and an image control signal in accordance with an input signal, the generating of the image data and the image control signal comprising:

when the input signal is an image signal for displaying a photographed image or text, generating the image data corresponding to a unit frame period composed of a plurality of frames as weighted image data corresponding to one frame period of the plurality of frames;

increasing an energy of an image of the display device corresponding to the weighted image data in proportion to a number of the plurality of frames in the unit frame period, wherein the generating of the weighted image data comprises generating a scan start signal for controlling a timing of when the plurality of scan signals start to be applied to the plurality of scan lines in synchronization with a camera driving signal; and decreasing a frequency of the scan start signal during a period when the camera driving signal is applied at a ratio that is inversely proportional to the number of the plurality of frames in the unit frame period in comparison with a frequency during a general operation period when the camera driving signal is not applied.

12. The method of claim 11, wherein the generating of the weighted image data comprises receiving the camera driving signal from a camera for generating the photographed image, and determining whether or not the input signal is the image signal for displaying the photographed image in accordance with the camera driving signal.

13. The method of claim 11, wherein the increasing of the energy of the weighted image data in proportion to the number of plurality of frames in the unit frame period comprises:

generating a load signal for controlling a timing of when the plurality of data signals start to be applied to the plurality of data lines in synchronization with the scan start signal; and controlling a level of the plurality of data signals so that a brightness of the plurality of pixels during a period when the camera driving signal is applied increases to be in proportion to the number of the plurality of frames in the unit frame period in comparison with a brightness of the plurality of pixels during the general operation period.

14. The method of claim 11, wherein the generating of the weighted image data comprises determining whether or not the input signal is the image signal for displaying the text in accordance with a text display signal.

15. The method of claim 14, wherein the generating of the weighted image data comprises:

generating a scan start signal for controlling a timing of when the plurality of scan signals start to be applied to the plurality of scan lines in synchronization with the text display signal; and decreasing a frequency of the scan start signal during a period when the text display signal is applied at a ratio that is inversely proportional to the number of the plurality of frames in the unit frame period in comparison with a frequency during a general operation period when the text display signal is not applied.

16. The method of claim 15, wherein the increasing of the energy of the weighted image data in proportion to the number of plurality of frames in the unit frame period comprises:

generating a load signal for controlling a timing of when the plurality of data signals start to be applied to the plurality of data lines in synchronization with the scan start signal; and controlling a level of the plurality of data signals so that a brightness of the plurality of pixels during a period when the text display signal is applied increases to be in proportion to the number of the plurality of frames in the unit frame period in comparison with a brightness of the plurality of pixels during the general operation period.

* * * * *